UNITED STATES PATENT OFFICE 2,300,611

STABILIZED INSECTICIDES

Ludwig J. Christmann, Bronxville, N. Y., and David W. Jayne, Jr., Old Greenwich, Conn., assignors to American Cyanamid Company, New York, N. Y., a corporation of Maine No Drawing. Application January 18, 1939, Serial No. 251,530

9 Claims. (Cl. 167—24)

This application is a continuation in part of our co-pending application Serial No. 643,290, filed November 18, 1932, now Patent No. 2,151,651 issued March 21, 1939.

This invention relates to insecticidal compositions and has particular relation to the naturally occurring insecticide rotenone.

The invention has for its main object the provision of insecticidal compositions of the above indicated character which are highly toxic to insect life and which retain their desirable insecticidal properties over a relatively long period of time.

Rotenone is the active principle of two species of plants known respectively as *Derris elliptica* and *Derris chinensis*. This active principle may also be isolated from other plants, such as *Lonchocharpus*, *Milletic tiawaniana*, *Hayata*, *Mindulea suberosa* and *Ormocarbum*. It is likewise obtained from a material employed by the Peruvians as a fish poison and termed by them "cubé."

Rotenone, which possesses excellent insecticidal properties, on exposure to light and air or oxygen gradually loses its desirable properties and in the course of time becomes ineffective and useless.

This invention involves the discovery that this gradual deterioration of rotenone can be materially retarded by incorporation therewith of certain substances which prolong its effective life and which does not materially interfere with the action thereof as an insecticidal composition.

We have discovered that certain compounds embraced in the class of aromatic amines can be employed as such stabilizers of rotenone. Where such stabilizer amines are relatively volatile in character, exposure of them over relatively extensive surfaces, such as occurs when an insecticide is spread, as by spraying, upon vegetation or other common materials on which insecticides are applied, would result in a gradual loss of the stabilizer amine through vaporization.

Reduction of volatility of aromatic amines so as to obtain permanence with rotenone or similar insecticides, is obtained by the introduction into the hydrocarbon nucleus of the aromatic amine certain substituents such as chlorine, hydroxy, carboxyl, or similar groups.

The present invention relates to a composition of matter containing rotenone, together with an aromatic amine compound which is a stabilizer for the insecticide and which is characterized by the presence of an amino group and also a carboxyl group in the aromatic hydrocarbon nucleus of the compound. This nucleus may be mono- or poly-nuclear, such as a naphthalene or an anthracene nucleus or a diphenyl nucleus. The carboxyl group may be in any position in the nucleus relative to the amino group.

Stabilizers for rotenone in accordance with our discovery have the following general formula:

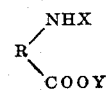

wherein R is an unsubstituted or substituted aryl radical, X is a member of the group consisting of hydrogen, and alkyl, acyl, aryl and aralkyl radicals and Y is a member of the group consisting of hydrogen, and ester-forming radicals, such as butyl, amyl, octyl, benzyl and the like, radicals. While the present invention, from its broader aspect, is not to be limited to oil soluble esters of the above compounds, it is desirable that the esters be oil soluble since it will facilitate incorporation of them into the oil which is to serve as the vehicle for the rotenone. Such oil vehicle may be petroleum hydrocarbons.

A specific example of a compound of the above general formula is anthranilic acid which embodies a benzene nucleus and in addition a carboxyl group which serves to reduce the volatility of the simple amine. Chlorine atoms may be introduced into the benzene nucleus of this compound and specific examples of such chlorine substituted anthranilic acids are the mono-chlor, and di-chlor compounds. It will be understood that the hydroxy substituted anthranilic acids are also embraced within the scope of the invention. It will be further understood that the poly-nuclear aromatic amines as well as the mono-nuclear aromatic amines may have further substituent groups in the hydrocarbon nuclei in addition to the carboxyl group present.

Typical of the anthranilic acid compounds which may be used as stabilizers of rotenone are the following: anthranilic acid, acetyl anthranilic acid, methyl anthranilic acid, benzyl anthranilic acid, mono-nuclear aryl substituted anthranilic acids, such as phenyl anthranilic acid, dinitro phenyl anthranilic acid, o-tolyl anthranilic acid, p-tolyl anthranilic acid, m-xylyl anthranilic acid, toluol-sulfo anthranilic acid and di-nuclear aryl substituted anthranilic acids, such as beta-naphthyl anthranilic acid and naphthalene-sulfo anthranilic acid. Typical of poly-nuclear aromatic amines which may be employed, is amino naphthoic acid and substitution products thereof analogous to the substituted anthranilic acids.

The compositions containing rotenone and a stabilizer for the insecticide are not to be limited to the inclusion therein of the stabilizers in their uncombined form, i. e., where the carboxyl group of the aromatic amine is in its free or unsubstituted form, but the aromatic amines may be present in the composition as stabilizers in the form of oil-soluble salts or esters. Such oil-soluble salts may be formed by reaction between the carboxyl group of the aromatic amine and an organic base, for example, diphenyl guanidine, amyl amine and the like. Oil soluble esters may be formed by esterifying the carboxyl group of the aromatic amine with alcohols which give esters which are soluble in oils such as petroleum hydrocarbons, for example, with butyl, amyl, octyl, benzyl, and the like alcohols.

The stabilizing material may be incorporated with rotenone in substantially any desired or convenient manner; for example, the rotenone may be dissolved in a solvent such as acetone which is also a solvent for most of the stabilizers, and then the stabilizer may be incorporated therewith. The choice of solvents will be governed by the solubility therein of both the insecticide and the stabilizer. The amount of stabilizer amine to be added to the insecticide may vary between 10 to 100% of the weight of the insecticide depending upon the effectiveness of the stabilizer and/or the extent to which stabilization is desired. Of course, amounts of stabilizer of less than 10% may be employed where a particular stabilizer is especially effective.

It will also be understood that any two or more of the above described stabilizers may be mixed and the mixture employed with rotenone. These mixtures may under some circumstances be more desirable than any of the compounds used singly. It will also be understood that stabilizers, such as above described, may be incorporated with rotenone powder, with or without inert diluents such as kieselguhr or the like, which are used for dusting purposes.

The above compounds employed as stabilizers do not decompose the rotenone or appreciably retard the activity thereof as an insecticide, but instead, in some cases, the stabilizers themselves may exhibit considerable insecticidal power and thus increase rather than decrease the insecticidal activity of the mixture.

Although we have set forth above only certain compounds as stabilizers of rotenone, these compounds are to be taken as indicative of the extent of our discovery, rather than as limiting the scope of the invention, which is set forth in the appended claims.

We claim:

1. A composition of matter containing rotenone together with a compound of the formula

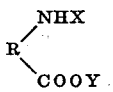

wherein R is an aryl radical, X is a member of the group consisting of alkyl, acyl, aryl and aralkyl radicals and Y is a member of the group consisting of hydrogen, and ester-forming radicals.

2. A composition of matter containing rotenone together with a compound of the formula

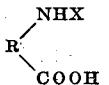

wherein R is an aryl radical, X is a member of the group consisting of alkyl, acyl, aryl, and aralkyl radicals and Y is a member of the group consisting of hydrogen, and ester-forming radicals which form oil-soluble esters.

3. A composition of matter containing rotenone and in addition an oil-soluble ester formed by the reaction between an organic base and the carboxyl group of a compound of the formula

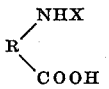

wherein R is an aryl radical and X is a member of the group consisting of alkyl, acyl, aryl, and aralkyl radicals.

4. A composition of matter containing rotenone and in addition a compound of the formula

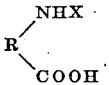

wherein R is a mono-nuclear aryl radical and X is a mono-nuclear aryl radical.

5. A composition of matter containing rotenone and in addition a compound of the formula

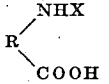

wherein R is a mono-nuclear aryl radical and X is an alkylated benzene radical.

6. A composition of matter containing rotenone and in addition a compound of the formula

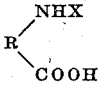

wherein R is a mono-nuclear aryl radical and X is a methylated benzene radical.

7. A composition of matter containing rotenone and in addition a compound of the formula

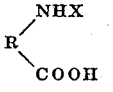

wherein R is a mono-nuclear aryl radical and X is a tolyl radical.

8. A composition of matter containing rotenone and in addition a compound of the formula

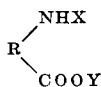

wherein R is a mono-nuclear aryl radical and X is a di-nuclear aryl radical.

9. A composition of matter containing rotenone and in addition a compound of the formula

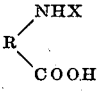

wherein R is a mono-nuclear aryl radical and X is a beta naphthyl radical.

LUDWIG J. CHRISTMANN.
DAVID W. JAYNE, JR.